United States Patent
Shen et al.

(10) Patent No.: US 10,725,851 B2
(45) Date of Patent: Jul. 28, 2020

(54) STORAGE DEVICE SELF-RECOVERY EXCEPTION ENGINE

(71) Applicant: Seagate Technology LLC, Cupertino, CA (US)

(72) Inventors: Jin Quan Shen, Singapore (SG); Tse Jen Lee, Singapore (SG); Hui Liu, Singapore (SG); Yong Peng Chng, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 167 days.

(21) Appl. No.: 15/965,561

(22) Filed: Apr. 27, 2018

(65) Prior Publication Data

US 2019/0332482 A1  Oct. 31, 2019

(51) Int. Cl.
*G06F 11/10* (2006.01)
*G06F 11/07* (2006.01)
*G06F 11/14* (2006.01)

(52) U.S. Cl.
CPC ...... *G06F 11/0793* (2013.01); *G06F 11/0745* (2013.01); *G06F 11/0757* (2013.01); *G06F 11/1004* (2013.01); *G06F 11/1435* (2013.01); *G06F 11/1441* (2013.01); *G06F 11/1428* (2013.01)

(58) Field of Classification Search
CPC combination set(s) only.
See application file for complete search history.

(56) References Cited

U.S. PATENT DOCUMENTS

| | | | |
|---|---|---|---|
| 6,125,459 A * | 9/2000 | Andoh | G06F 11/0727 711/161 |
| 7,827,443 B2 | 11/2010 | Eisen et al. | |
| 8,060,882 B2 | 11/2011 | Gulick | |
| 9,268,627 B2 | 2/2016 | Kraipak et al. | |
| 9,275,429 B2 * | 3/2016 | Alla, Sr. | G06F 9/445 |
| 9,430,314 B2 * | 8/2016 | Atri | G06F 11/0787 |
| 9,766,676 B2 | 9/2017 | Thevar et al. | |
| 9,798,624 B2 | 10/2017 | Herzi et al. | |
| 2011/0041005 A1 * | 2/2011 | Selinger | G06F 11/10 714/719 |
| 2013/0262918 A1 | 10/2013 | Nation et al. | |
| 2014/0052966 A1 | 2/2014 | Vahidsafa et al. | |

* cited by examiner

*Primary Examiner* — Joseph R Kudirka
*Assistant Examiner* — Kurosu Risa Altaf
(74) *Attorney, Agent, or Firm* — Westman, Champlin & Koehler, P.A.

(57) ABSTRACT

A data storage device that includes a data storage medium and a controller communicatively coupled to the data storage medium. The controller is configured to receive commands from a host and to detect a hung state in the data storage device. The controller is also configured to determine an execution status of a command, of the commands from the host, associated with the hung state. The controller is further configured to dynamically carry out a self-recovery operation in the data storage device to clear the hung state. The self-recovery operation includes steps that depend upon the execution status of the command associated with the hung state.

17 Claims, 6 Drawing Sheets

STORAGE DEVICE SELF-RECOVERY EXCEPTION ENGINE

BACKGROUND

Data storage devices are typically included in systems having one or more host computers. Examples of data storage devices include hard disk drives (HDDs), which are electromechanical devices containing spinning disks and movable read/write heads, solid state drives (SSDs), which use memory chips and contain no moving parts, and hybrid drives, which combine features of HDDs and SSDs in one unit.

SUMMARY

In one embodiment, a data storage device is provided. The data storage device includes a data storage medium and a controller communicatively coupled to the data storage medium. The controller is configured to receive commands from a host, and to detect a hung state in the data storage device. The controller is also configured to determine an execution status of a command, of the commands from the host, associated with the hung state. The controller is further configured to dynamically carry out a self-recovery operation in the data storage device to clear the hung state. The self-recovery operation includes steps that depend upon the execution status of the command associated with the hung state.

In another embodiment, a method is provided. The method includes receiving commands from a host in a data storage device, and detecting, by a control circuit of the data storage device, a hung state in the data storage device. The method also includes determining an execution status of a command, of the commands from the host, associated with the hung state. The method further includes dynamically carrying out a self-recovery operation in the data storage device to clear the hung state. The self-recovery operation includes steps that depend upon the execution status of the command associated with the hung state.

In yet another embodiment, a data storage device is provided. The data storage device includes a data storage medium and a controller communicatively coupled to the data storage medium. The controller is configured to receive commands from a host and to detect a hung state in the data storage device. The controller is also configured to identify a command, of the commands from the host, associated with the hung state and to carry out a firmware reset to exit the hung state. The controller is further configured to re-initiate the command.

This summary is not intended to describe each disclosed embodiment or every implementation of the storage device self-recovery exception engine described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1:
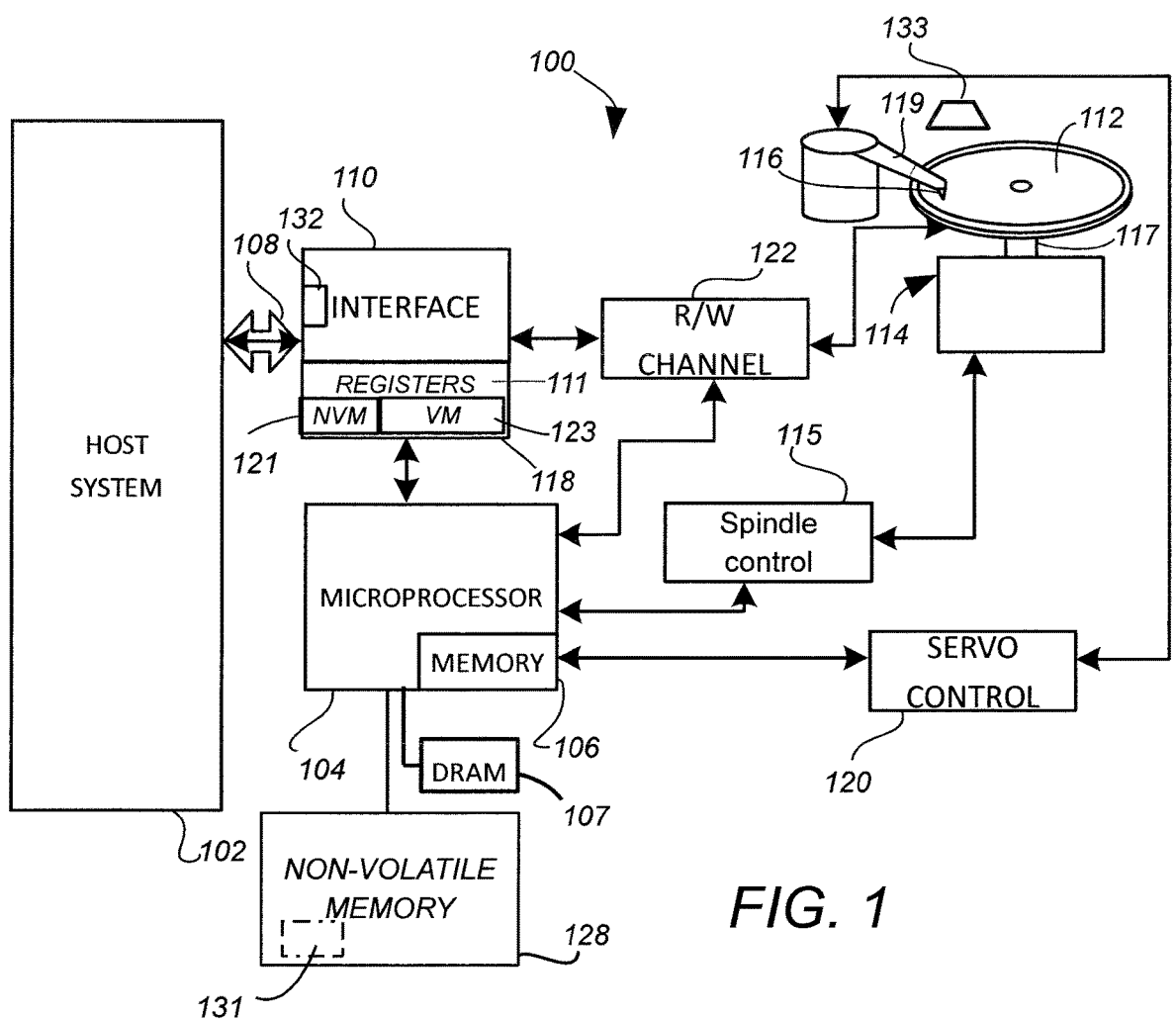
FIG. 1 is a block diagram of a disc drive that employs a self-recovery technique in accordance with one embodiment.

Embodiments of the disclosure generally relate to a technique for recovering from a "hung" state within a data storage device, which may result from, for example, conditions within the data storage device that prevent the device from completing a command sent by a host.

Data storage devices such as disc drives are made of various high technology components and subsystems. When a disc drive is operating, it may enter into a hung state if one of its subsystems encounters an error. In such a situation, the host system that includes the disc drive may also enter into a hung state (e.g., stop responding). The hung state may result in a blue or black screen displayed by the host (e.g., a personal computer (PC)). Currently, an end user may have to power cycle the host system in order to exit from the hung state.

Embodiments of the disclosure provide a mechanism that enables a data storage device to self-recover from a hung state due to a command timeout condition, for example, and thereby prevents the host from also entering into a hung state. The self-recovery mechanism may apply different recovery procedures depending upon a nature and/or an execution status of the command associated with the hung state in the data storage device. As part of the recovery procedure, any data associated with the command may be preserved, the command frame and interface setting parameters will be saved before reset and will be restored after reset, and a firmware reset may also automatically be performed. An example of data storage device that employs such a self-recovery technique is described below in connection with FIG. 1.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a block diagram of a disc drive 100 that employs a self-recovery technique in accordance with one embodiment. It should be noted that disc drive 100 is a particular example of a data storage device and other types of data storage devices may employ the self-recovery techniques in accordance with the present embodiments.

Disc drive 100 is shown in FIG. 1 to be operably connected to a host computer 102 in which disc drive 100 may be mounted. Disc drive 100 includes a microprocessor system/control circuit 104 that generally provides top level communication and control for disc drive 100 in conjunction with programming for microprocessor system/control circuit 104 that may be stored in microprocessor memory 106. Disc drive 100 may communicate with host computer 102 using a bus 108.

Memory 106 can include random-access memory (RAM), dynamic random-access memory (DRAM), read only memory (ROM), and/or other sources of resident memory for microprocessor 104. Disc drive 100 includes one or more data storage discs 112. Discs 112 are rotated at a substantially constant high speed by a spindle motor 114 that is controlled by a spindle control circuit 115. In the embodiment of FIG. 1, a spindle or rotor 117 of the motor 114 holds the disc(s) 112. The motor 114 rotates the spindle or the rotor 117, which spins the disc(s) 112. One or more heads 116 communicate with the surface(s) of discs 112 to carry out data read/write operations. The radial position of heads 116 is controlled through the application of current to a coil in an actuator assembly including an actuator arm 119. A servo control system 120 provides such control. Actuator arm 119 including head(s) 116 may be parked on a ramp 133 when no read/write operations from/to discs(s) 112 are being carried out.

Data is transferred between host computer 102 and disc drive 100 by way of disc drive interface 110, which is coupled to a buffer 118 to facilitate high speed data transfer between host computer 102 and disc drive 100. In one embodiment, buffer 118 is constructed from solid-state components. In certain embodiments, buffer 118 may include a non-volatile memory (NVM) 121 and a volatile memory (VM) 123. In other embodiments, buffer 118 may comprise either NVM 121 or VM 123. While the buffer memory 118 is depicted in FIG. 1 as being physically co-located with interface 110, one skilled in the art should appreciate that buffer 118 may be electrically connected, yet physically separated from interface 110. Interface 110 may include registers 111 that are configured to store, for example, command frame data, which is described further below. It should be noted that, in some embodiments, multiple circuit elements of disc drive 100 (e.g., microprocessor 104 and interface 110) may be incorporated into a single chip to form a system on a chip.

Data to be written to disc drive 100 are passed from host computer 102 to buffer 118 and then to a read/write channel 122, which encodes and serializes the data and provides the requisite write current signals to heads 116. To retrieve data that have been previously stored by disc drive 100, read signals are generated by the heads 116 and provided to read/write channel 122. Read/write channel 122 and/or interface 110 perform read signal decoding, error detection, and error correction operations. The retrieved data may then be output to buffer 118 for transfer to the host computer 102 by interface 110.

As can be seen in FIG. 1, disc drive 100 may also include a non-volatile memory 128 that may serve as a space for storage of firmware modules, which may include instructions, executable by microprocessor 104, for carrying out various aspects of data storage, error handling, etc., within drive 100. In the embodiment of FIG. 1, memory 128 is physically separate from discs 112. The memory 128 may be of a different type than the discs 112. For example, in certain embodiments, memory 128 may be constructed from solid-state components. In one embodiment, memory 128 may be a Flash memory. It should be noted that, in different embodiments, the firmware modules may be stored in disc drive 100 memories other than memory 128. In embodiments of the disclosure, a self-recovery exception engine 131 may also be stored in memory 128. Disc drive 100 may also include a command timer 132 that helps determine whether a host command received in the drive is completed within a predetermined time.

The instructions within memory 128 may constitute several state engines, with each state engine controlling a different subsystem (e.g., a servo control subsystem including code associated with servo control 120, a low level read-write subsystem that controls data storage and write/read data to/from disc(s) 112, etc.). Each state engine may comprise multiple software functions with each software function configured to carry out an action that may result in a state change. A software function may sometimes fail (e.g., unexpectedly terminate or provide an erroneous output) and thereby enter into an erroneous state. Under such a condition, an error code may be provided to microprocessor/control circuit 104 identifying the subsystem in which the error occurred. In some conventional disc drives, such an error may result in the drive being unable to service host commands, thereby causing the host to hang up. A similar hang up condition may be caused when a conventional disc drive does not service a host command within a predetermined time period. As indicated above, embodiments of the disclosure employ command timer 132 and self-recovery exception engine 131 to prevent such hang up conditions. In some embodiments, timer 132 monitors the command execution time and, if a predetermined time period expires without any indication of completion of the command, a timer service routine will invoke the self-recovery exception engine 131 to prevent interface 110 and bus 108 from entering into a hung state. An example host command structure is briefly described below in connection with FIGS. 2A-2C. Thereafter, details regarding self-recovery from a hung state in a data storage device are provided in connection with FIGS. 3 and 4.

Figure 2A:
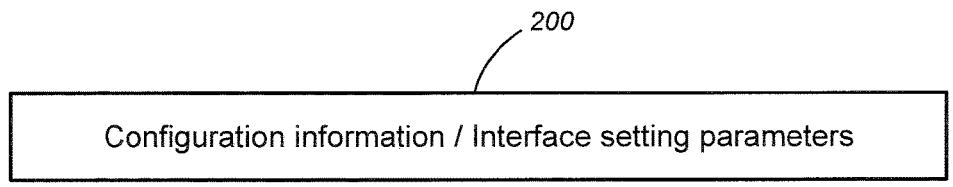
FIGS. 2A, 2B and 2C are block diagrams of an example host command structure.

FIG. 2A illustrates a single block 200 that represents configuration information or interface setting parameters that are sent by the host system (e.g., 102 of FIG. 1) to the drive (e.g., 100 of FIG. 1) to enable the drive 100 to enter into a configuration that supports execution of host commands in the drive 100. In the interest of simplification, details regarding the configuration information or interface setting parameters are not provided. The configuration information or interface setting parameters may be stored, for example, in buffer 118 (of FIG. 1) or in any other suitable memory or registers in disc drive 100 of FIG. 1. Once the disc drive 100 is properly configured, host commands may be executed in the drive 100. An example of a host command structure or a command frame is described below in connection with FIG. 2B.

Figure 2B:
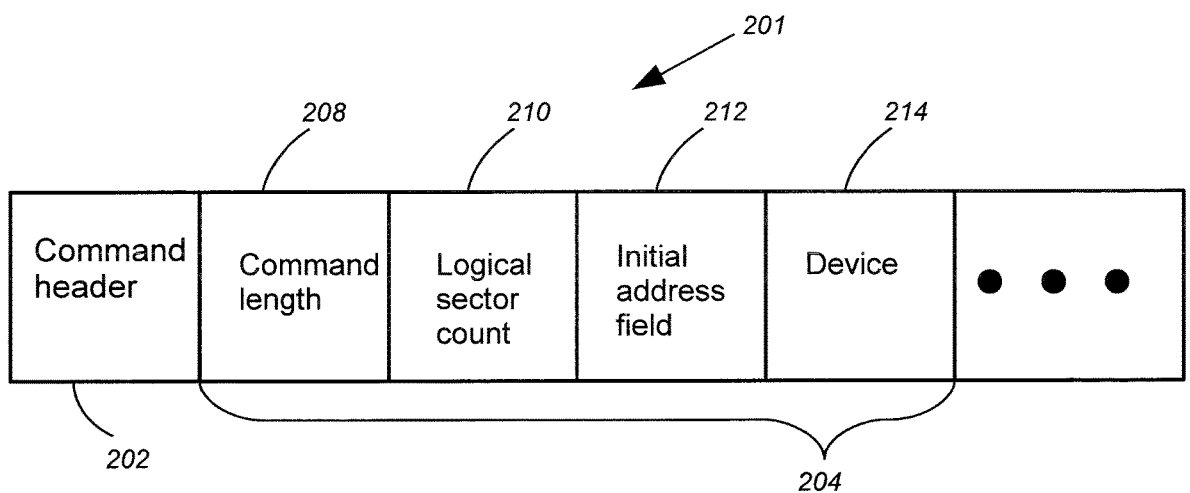

FIG. 2B is a block diagram of an example host command structure or command frame 201 (e.g., an example structure of a command sent by host 102 of FIG. 1 to disc drive 100 of FIG. 1). In the example of FIG. 2B, host command structure 201 includes a command header field 202 and a command body 204. Command header field 202 may be utilized to transmit identification information related to the command. For example, command header 202 may include information that indicates the type of command (e.g., read command, write command, etc.) being sent to the data storage device. In general, such information may identify a type of operation to be performed by the data storage device when it receives the command.

Command body 204 may include several different fields that store different data portions. Examples of command body 204 fields include a command length field 208, a logical sector count field 210, an initial address field 212, a device field 214, etc. These different fields are described briefly below.

Command length field 208 may be utilized to include, for example, a number of bytes in the command 201. In general, command length field 208 may include any suitable indicator of the length of the command 201. It should be noted that the command length field 208 may be excluded in devices/systems that employ fixed-length commands. Count field 210 may be utilized to include a number of logical sectors to be transferred (e.g., a number of logical sectors to be transferred from the host to the data storage device as part of a write command, or a number of logical sectors to be transferred to the host from the data storage device as part of a read command). In general, count field 210 may include any suitable indicator of the number of logical sectors to be transferred. Initial address field 212 may include, for example, a logical block address (LBA) of a first logical sector to be transferred. Device field 214 may be utilized to include identification information for the devices between which the data transfer is taking place.

It should be noted that, in the interest of simplification, additional fields that may be utilized to include, for example, data integrity/authentication information, etc., are not shown in FIG. 2B. Further, FIG. 2B illustrates one non-limiting example of a host command structure or command frames, and different host command structures or command frames may be utilized in different applications/devices.

Once a disc drive such as 100 receives a command frame such as 201, it may store the command frame 201 in registers such as 111 of FIG. 1. Further, the disc drive may send a message to the host acknowledging receipt of the command. Upon receipt of the acknowledgement, the host may send packets of data to the disc drive if the command is a write command, or the host may wait to receive packets of data from the disc drive if the command is a read command.

Figure 2C:
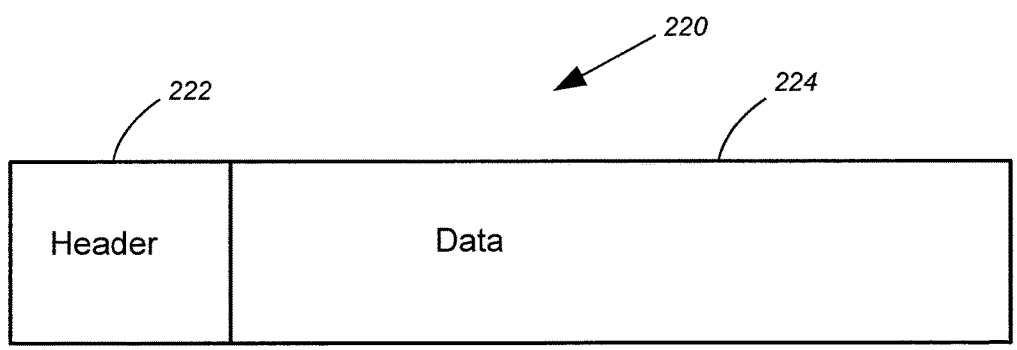

FIG. 2C illustrates fields of an example data packet 220 that may be sent by the host to the disc drive as part of a write operation, or sent from the disc drive to the host as part of a read operation. The data packet may include a header 222 and data 224. The header 222 includes information indicating that the packet 220 is a data packet, and may include other metadata that describes the data in field 224. As indicated above, either before or during a data transfer operation (e.g., a read operation or a write operation) the disc drive may enter into a hung state. A method of automatically recovering from a hung state in a data storage device (e.g., a disc drive) is described below in connection with FIG. 3.

Figure 3A:
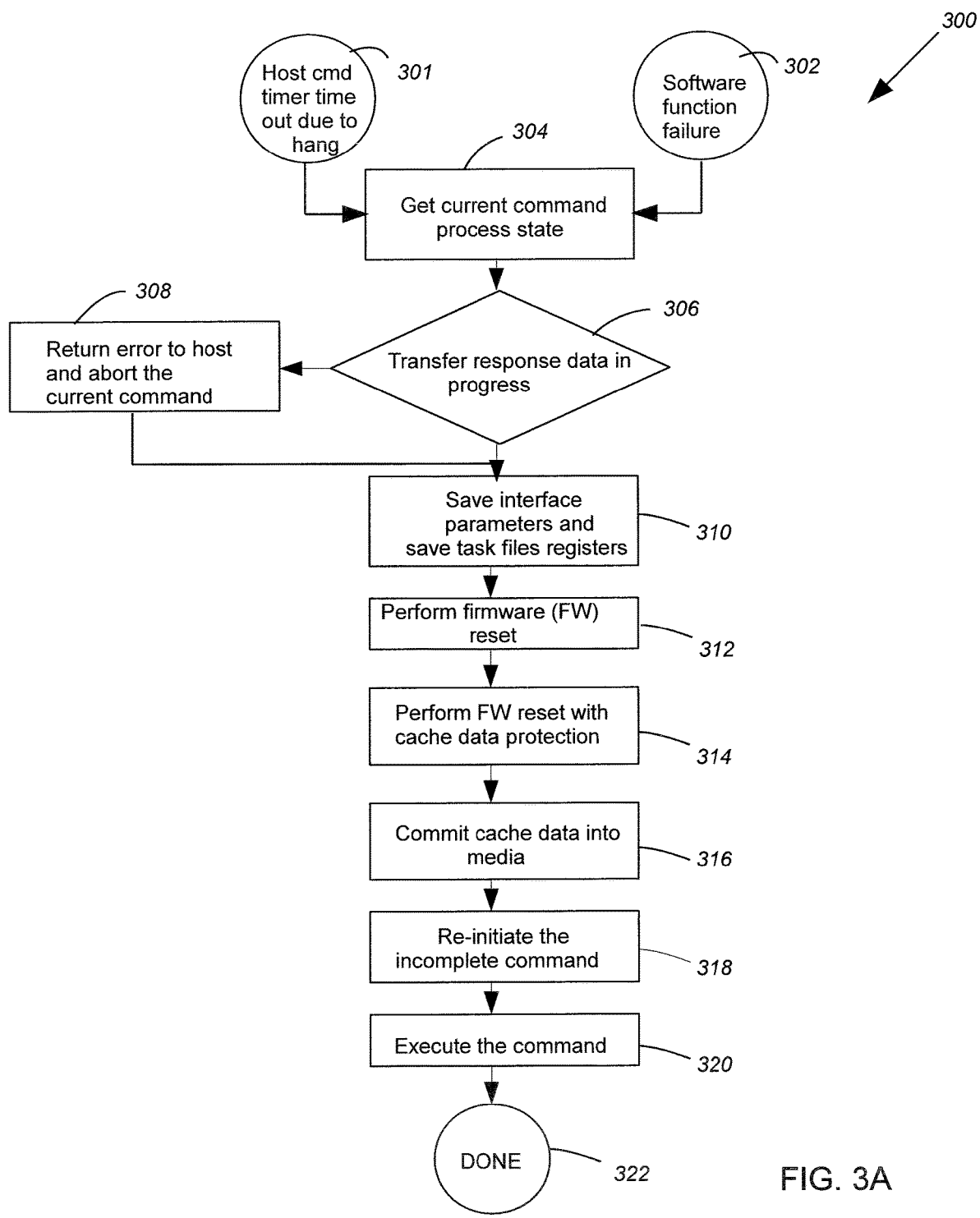
FIG. 3A is a flowchart of a data storage device self-recovery method in accordance with one embodiment.

FIG. 3A is a flowchart of a data storage device self-recovery method 300 in accordance with one embodiment. At block 304, an error in the data storage device that prevents a current host command from executing or completing is received. The error may be due to the current host command failing to complete within a predetermined time period, and therefore causing the data storage device to hang (shown at 301 in FIG. 3A). Alternatively, a software function in a subsystem of the data storage device may fail and thereby enter into an erroneous state and cause the data storage device to hang up (shown in 302 of FIG. 3A). Under such a condition, an error code identifying the subsystem in which the error occurred is received at block 304. At block 306, a determination is made as to whether data associated with the current command is being transferred to the host. If a data transfer to the host is in progress when the data storage device enters into the hung state, at block 308, error information is sent to the host, and the current command is aborted. The error sent to the host may depend on a type of the current command. Examples of returned errors include an LBA field invalid error for a write command, a cyclic redundancy check (CRC) error for a read command, a native command queueing (NCQ) error when the current command is one of a group of commands sent by the host, or the like.

If no data associated with the current command is being transferred to the host (e.g., the data storage device is hung up before transferring response data to the host), at block 310, several parameters associated with the command may be collected from different memories/storage areas in the data storage device and saved in a single memory in the data storage device to enable reconstruction of the command. This command parameter collection is carried out to prevent loss of command parameters due to memory/register resets that may be carried out as part of the self-recovery operation. In one embodiment, the parameters associated with the command may be saved by creating a data frame for the parameters and collecting the parameters from registers 111, buffer 118, etc., in the data frame. The data frame including the collected parameters associated with the command may be stored in a suitable memory in the data storage device (e.g., in microprocessor memory 106 or in a separate DRAM 107 of disc drive 100 of FIG. 1).

Figure 3B:
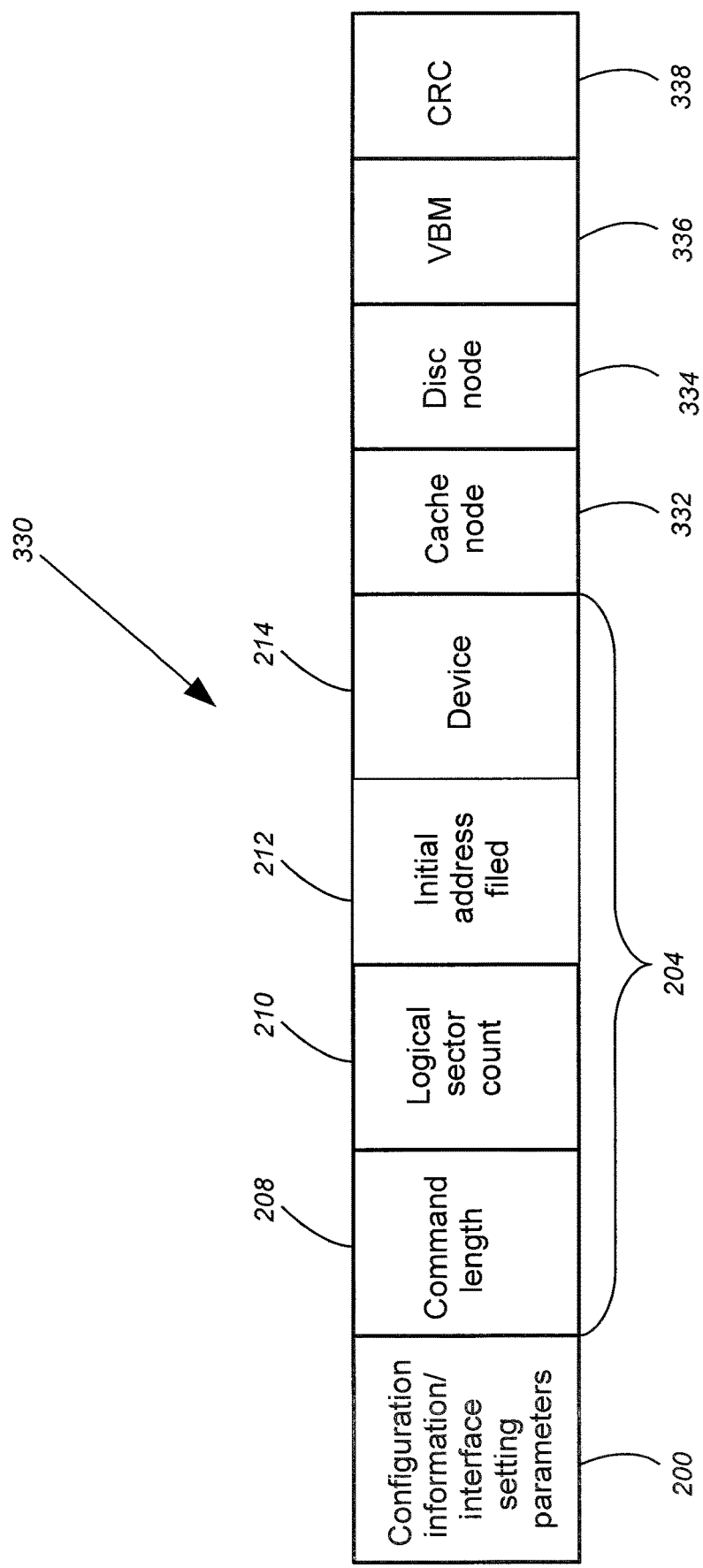
FIG. 3B is a block diagram of a data frame formed by one or more steps of the method embodiments of FIG. 3A.

FIG. 3B is a block diagram that illustrates an example data frame 330. Data frame 330 may include configuration information or interface setting parameters 200 collected from buffer 118, command body parameters 204 (e.g., command length 208 logical sector count 210, initial address 212, device 214, etc.) collected from registers 111, cache node parameters 332 that indicate where command data is stored in the buffer 118, disc node parameters 334 that indicate disc 112 locations for data associated with the command, a virtual buffer management (VBM) link list 336 that links command data storage locations in the buffer 118 when data associated with the command is stored in, for example, non-contiguous locations. An error-detecting code (e.g., CRC) 338 for the parameters (e.g., 200, 204, 332, 334 and 336) in the data frame 330 may also be calculated to ensure that the different parameters in the data frame may properly be recovered. It should be noted that, in some embodiments, command header 202 may also be included in data frame 330.

Referring back to FIG. 3A, at block 312, a reset (e.g., a firmware reset) is performed to overcome the hang condition. If the data storage device is a disc drive (such as 100 shown in FIG. 1), actuator arm 119 including head(s) 116 may be parked on a ramp 133 during the firmware reset. As part of the reset operation of block 312, configuration information or interface setting parameters may be restored (e.g., recovered from data frame 330 and stored in buffer 118). At block 314, any cache data available during the firmware reset is protected by, for example, not initializing the cache buffer. At block 316, the cache data is committed to main storage locations (e.g. committed to sectors on disc(s) 112 of FIG. 1) after the firmware reset. At block 318, command header information 204 may be restored from the data frame 330 (e.g., recovered from data frame 330 and stored in buffer 118), thereby enabling re-initiation of the host command associated with the hung state in the data storage device. At block 320, the re-initiated command is executed. The process ends at block 322.

Figure 4:
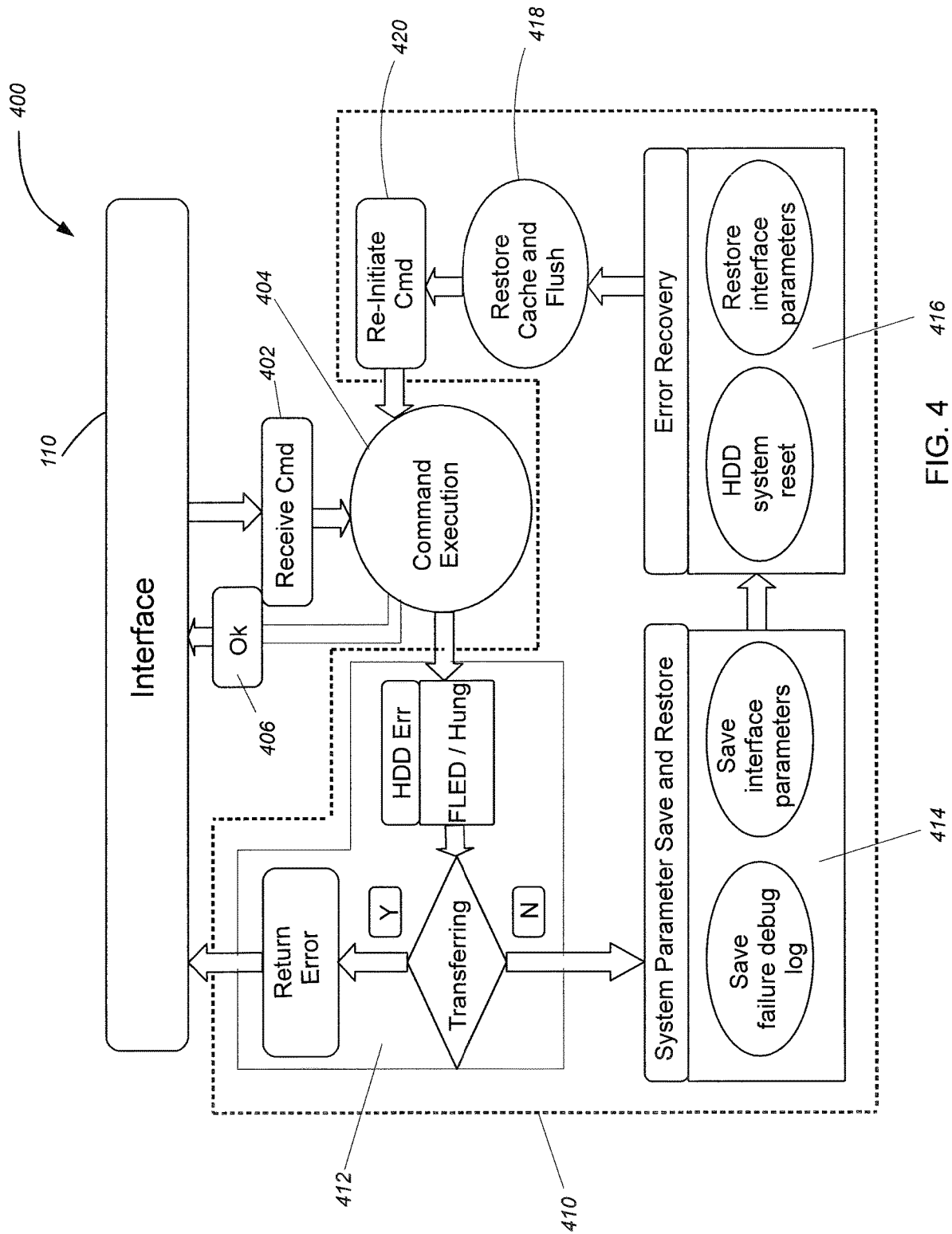
FIG. 4 is simplified block diagram showing modules of a self-recovery exception engine in accordance with one embodiment.

FIG. 4 is simplified block diagram 400 showing modules of a self-recovery exception engine 410 in accordance with one embodiment. The elements of self-recovery exception engine 410 of FIG. 4 are illustratively included in a self-recovery exception engine such as 131 of FIG. 1. Elements of self-recovery exception engine 410 include an initial error processing module 412, a system parameter restoration module 414, an error recovery module 416, a cache restoration module 418 and a command re-initiation module 420.

Initial error processing module 412 includes program code having instructions to carry out blocks 304-308 of FIG. 3A. System parameter restoration module 414 includes program code with instructions to carry out block 310 of FIG. 3A, and may also include code that preserves debug information that may include reasons for entry into the hung state. Error recovery module 416 includes instructions to carry out block 312 of FIG. 3A. Cache restoration module 418 includes instructions to carry out blocks 314 and 316 of FIG. 3A, and command re-initiation module 420 includes instructions to carry out block 318 of FIG. 3A.

In the embodiment of FIG. 4, a host command is received at 402 via interface 110. The host command is executed at 404. If the command executes without causing a hang up in the data storage device, communication 406 is sent to the host via interface 110. If the data storage device enters into a hung state, the data storage device controller (e.g., 104 of FIG. 1) executes the self-recovery exception engine 410.

Figure 5:
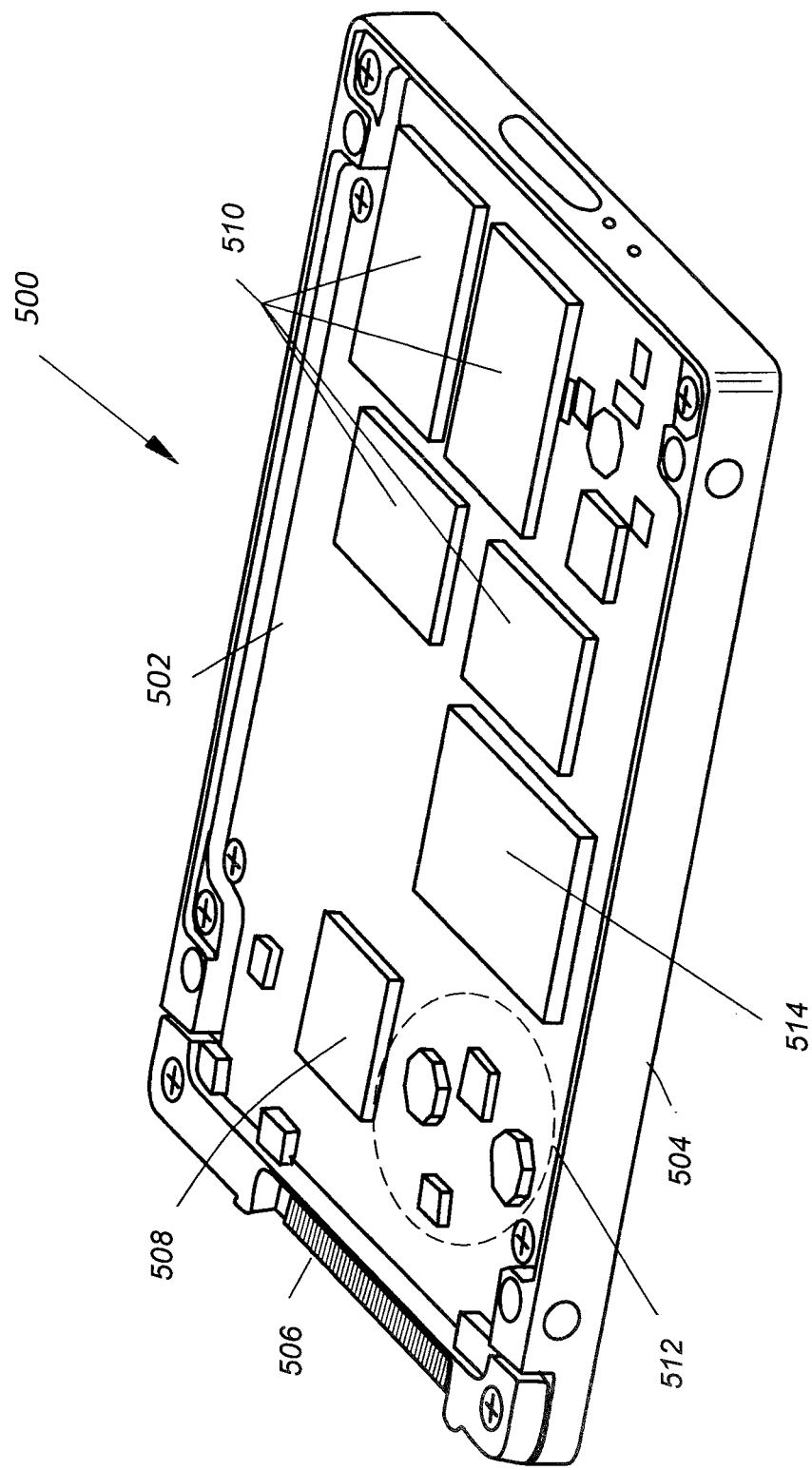
FIG. 5 is an isometric view of a solid-state drive that employs a self-recovery technique in accordance with one embodiment.

FIG. 5 illustrates an oblique view of a solid state drive (SSD) 500 in which the self-recovery techniques described above are useful. SSD 500 includes one or more circuit card assemblies 502 and typically includes a protective, supportive housing 504, a top cover (not shown), and one or more interface connectors 506. SSD 500 further includes a controller ASIC 508, one or more non-volatile memory devices 510, and power regulation circuitry 512. The memory devices 510 are essentially the SSD's data storage media for the caches and main store. In some applications, SSD 500 further includes a power-backup energy storage device, such as a super-capacitor 514.

In accordance with certain aspects, the SSD 500 includes a circuit card assembly 502 that includes a connector 506 for connection to a host computer. In accordance with certain aspects, the connector 506 includes a NVMe (non-volatile memory express), SCSI, SAS, FC-AL (fiber channel arbitrated loop), PCI-E (peripheral component interconnect express), IDE (integrated drive electronics), AT (advanced technology), ATA (advanced technology attachment), SATA, IEEE (institute of electrical and electronics engineers)-1394, USB or other interface connector adapted for connection to a host.

In the embodiment of FIG. 5, one of non-volatile memory device 510 may be used to store firmware modules and may also store a self-recovery exception engine such as 410 of FIG. 4. Another one of memories 510 may serve as a cache memory for device 500 and the remaining memories 510 may constitute a main store of device 500. In SSD 500, controller ASIC 508 executes the self-recovery exception engine if the device 500 enters into a hung state.

In accordance with various embodiments, the methods described herein may be implemented as one or more software programs running on one or more computer processors or controllers, such as those included in devices 100 and 500. Dedicated hardware implementations including, but not limited to, application specific integrated circuits, programmable logic arrays and other hardware devices can likewise be constructed to implement the methods described herein.

Although the operations in some embodiments are described in a particular sequence, it should be understood that this manner of description encompasses rearrangement. For example, operations described sequentially may in some cases be rearranged or performed to operate in parallel.

It should be noted that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   a data storage medium;
   a controller communicatively coupled to the data storage medium, the controller configured to:
   receive commands from a host;
   detect a hung state in the data storage device;
   determine an execution status of a command, of the commands from the host, associated with the hung state;
   dynamically carry out a self-recovery operation in the data storage device to clear the hung state, the self-recovery operation comprising steps that depend upon the execution status of the command associated with the hung state; and
   as part ref the self-recovery operation, save parameters associated with the command to enable reconstruction of the command when the execution status of the command indicates that no data transfer between the host and the data storage device is in process.

2. The data storage device of claim 1 and wherein the controller is further configured to, as part of the self-recovery operation, save the parameters associated with the command by creating a data frame for the parameters and collecting the parameters in the data frame.

3. The data storage device of claim 2 and wherein the parameters comprise command register parameters, cache node parameters, disc node parameters, a virtual buffer management link list and interface settings.

4. The data storage device of claim 3 and wherein the controller is further configured to, as part of the self-recovery operation, generate an error-detecting code for the parameters in the data frame.

5. The data storage device of claim 4 and wherein the controller is further configured to, as part of the self-recovery operation, restore the host command from the parameters in the data frame and the error-detecting code for the parameters in the data frame.

6. The data storage device of claim 5 and wherein the controller is further configured to, as part of the self-recovery operation, perform a firmware reset in the data storage device.

7. The data storage device of claim 6 and wherein the controller is further configured to, as part of the self-recovery operation, restore the interface settings.

8. The data storage device of claim 7 and further comprising a cache memory that is separate from the data storage medium, and wherein the controller is further configured to, as part of the self-recovery operation, commit any data in the cache memory to the data storage medium during the firmware reset.

9. The data storage device of claim 8 and wherein the controller is further configured to, as part of the self-recovery operation, re-initiate the command.

10. A method comprising:
    receiving commands from a host in a data storage device;
    detecting, by a control circuit of the data storage device, a hung state in the data storage device;
    determining an execution status of a command, of the commands from the host, associated with the hung state;
    dynamically carrying out a self-recovery operation in the data storage device to clear the hung state, the self-recovery operation comprising steps that depend upon the execution status of the command associated with the hung state; and
    as part of the self-recovery operation, saving parameters associated with the command to enable reconstruction of the command when the execution status of the command indicates that no data transfer between the host and the data storage device is in process.

11. The method of claim 10 and further comprising, as part of the self-recovery operation, saving the parameters associated with the command by creating a data frame for the parameters and collecting the parameters in the data frame.

12. The method of claim 11 and further comprising, as part of the self-recovery operation, calculating an error-detecting code for the parameters in the data frame.

13. The method of claim 12 and further comprising restoring the host command from the parameters in the data frame and the error-detecting code for the parameters in the data frame.

14. The method of claim 13 and further comprising performing a firmware reset in the data storage device.

15. The method of claim 14 and further comprising re-initiating the command.

16. A data storage device comprising:
    a data storage medium;
    a controller communicatively coupled to the data storage medium, the controller configured to:
    receive commands from a host;
    detect a hung state in the data storage device;
    determine an execution status of a command, of the commands from the host, associated with the hung state;
    dynamically carry out a self-recovery operation in the data storage device to clear the hung state, the self-recovery operation comprising steps that depend upon the execution status of the command associated with the hung state; and
    upon the self-recovery from the hung state, return an error code corresponding to the hung state to the host if the execution status of the command indicates that a data transfer between the host and the data storage device is in process.

17. The data storage device of claim 16 and wherein the controller is further configured to:
    return a logical block address (LBA) field invalid error code to the host if the command associated with the hung state is a write command; and
    return a cyclic redundancy error (CRC) error code to the host if the command associated with the hung state is a read command.

* * * * *